3,344,081
SINTERED URANIUM DIOXIDE CONTAINING YTTRIUM OXIDE

Charles Anthony Elyard, Wolston, Coventry, and Terence Jefferson Potter, Rugby, England, assignors to United Kingdom Atomic Energy Authority, London, England
No Drawing. Filed Jan. 24, 1966, Ser. No. 522,412
Claims priority, application Great Britain, Jan. 22, 1965, 2,935/65
3 Claims. (Cl. 252—301.1)

This invention is concerned with the preparation of uranium dioxide for use in nuclear reactors.

When polycrystalline ceramic uranium dioxide ($UO_2$) is employed as a fuel in a nuclear reactor and is irradiated for long periods of time at high temperatures, stable gases, in particular xenon and krypton, which are produced as a result of the fission of the $U^{235}$ nuclei are released from the ceramic at a rate which is determined by the temperature of the ceramic. It may be noted that when using it as a fuel it is usual to employ enriched uranium dioxide. That is, a material in which the proportion of the uranium isotope of mass 235 is higher than it is in naturally occurring uranium containing materials. If too much xenon and krypton is liberated (for example, because the temperature may be above 1600° C.) a high gas pressure will be set up within the container holding the $UO_2$ fuel, and there is a risk that the container may burst. Further, it is usual to include a quantity of helium gas in the container in order to assist the transfer of heat from the surface of the $UO_2$ to the container. Addition of xenon and krypton to this helium results in a reduction of its thermal conductivity and may result in overheating of the $UO_2$.

At temperatures of 1600° C. and lower, the release of xenon and krypton from the ceramic $UO_2$ is believed to take place by the slow diffusion of these gases through the solid ceramic to a surface from which they are released, and the rate of release can be reduced by making the ceramic as dense as possible. At these temperatures relatively little structural change occurs in the ceramic, although there may be a little grain growth at 1600° C. At higher temperatures, however, and particularly where a steep thermal gradient exists, as for instance between the centre and the outside of a $UO_2$ ceramic fuel, major structural changes can occur in the $UO_2$ and give much poorer properties, in that the fission gases may be released more readily. The normal equi-axed grain structure is changed and columnar grains are formed with a length much greater than their breadth. These columnar grains lie along the direction of the temperature gradient. Frequently, transverse voids exist across the columnar grains and a central void is formed in the fuel. Typically a $UO_2$ ceramic with an initial grain size of the order of 10 microns may change to show columnar grains many hundred microns in length by a few tens of microns in breadth. It has been observed in pile that a rapid release of fission xenon and krypton is associated with these major changes in structure. Thus in designing nuclear reactors it is necessary to limit the centre temperature of a uranium dioxide fuel to a maximum of 1600° C. in order to avoid excessive gas release, but even so it is possible for overheating to occur under certain fault conditions. A form of ceramic dioxide which does not undergo columnar grain growth is therefore desirable.

According to the present invention, a $UO_2$ ceramic which does not undergo columnar grain growth when subjected to steep temperature gradients at temperatures in excess of 1600° C. may be prepared by incorporating a small amount of another refractory oxide and in particular of yttrium oxide ($Y_2O_3$) with the $UO_2$. A concentration of between 0.5 and 5 wt. percent of $Y_2O_3$ is suitable for this purpose and the preferred range is 1.25 to 3 wt. percent.

Suitable methods of incorporating yttrium oxide are to mix together $UO_2$ and $Y_2O_3$ powders, or to add the yttrium as a solution of one of its compounds to the $UO_2$ powder, dry the resulting slurry and convert the yttrium compound to the oxide. Subsequently a ceramic is fabricated from the resulting power by conventional ceramic techniques. The powder may, for example, be die pressed, slip cast or extruded and then sintered. Sintering may be performed in a reducing atmosphere such as hydrogen, or in a neutral atmosphere such as argon, or in a slightly oxidising atmosphere such as steam. As the stoichiometric form of $UO_2$ is preferred for use as a reactor fuel, a subsequent firing in hydrogen is required if sintering is performed in a neutral or oxidising atmosphere, in order to ensure that the $UO_2$ does not contain excess oxygen.

EXAMPLES

A ceramic containing approximately 2 wt. percent of $Y_2O_3$ was prepared in the following manner. A uranium dioxide powder of composition $UO_{2.04}$ was mixed with $Y_2O_3$ powder by grinding the two together in a mortar. A polybutyl methacrylate binder was added to the resulting powder, which was then die pressed at a pressure of 25 tons/sq. in. The binder was then removed from the pressed compacts by heating slowly to 800° C. in a hydrogen atmosphere and holding at that temperature for two hours. Subsequently the compacts were sintered in a hydrogen atmosphere by heating at a rate of 400° C. per hour to a temperature of 1750° C. and holding at that temperature for 2 hours. A ceramic prepared in this way had a density of 1.26 gm./cc. The grain size of the material was about 10 microns as determined by microscopic examination of polished and etched sections.

This ceramic was then subjected to a thermal gradient in an arc image furnace by attaching one face of a cylindrical specimen ¼″ long to a water cooled copper block whilst the opposite face was heated to a temperature of 1800° C. This test was performed in an argon atmosphere for a period of 25 hours and the specimen was then examined by sectioning along its length (i.e. along the thermal gradient), polishing and etching. Although some equi-axed grain growth had occurred in the hottest regions of this specimen to give a grain size of the order of 40 microns, no columnar grain growth had occurred.

For comparison, a uranium dioxide ceramic containing no yttrium oxide addition was heated in an arc image furnace in a similar manner. The grain size of this material before heating was of the order of 10 microns; after heating, columnar grains about 250 microns in length by 40 microns breadth had formed in the hottest region.

A further test in the arc image furnace showed that no columnar grain growth occurred in the ceramic containing 2% $Y_2O_3$ even when the hot face temperature was raised to 2000° C.

Other ceramics containing 0.2, 1 and 5 wt. percent of $Y_2O_3$ were prepared in the manner described above and were tested in the arc image furnace. The results of all these tests are shown in the table.

| $Y_2O_3$ Concentration, wt. percent | Grain Form in Hot Region | |
|---|---|---|
| | Hot face at 1,800° C. | Hot face at 2,000° C. |
| 0.2 | Columnar, ~250 x 40 microns. | |
| 1 | Equiaxed, ~40 microns. | Very slightly columnar, ~70 x 40 microns. |
| 2 | ----do---- | Equiaxed, ~40 microns. |
| 5 | ----do---- | |

Thus it is seen that whilst the presence of 1% $Y_2O_3$ can prevent the formation of columnar grains in uranium dioxide at temperatures up to 1800° C. there is still a tendency to form columnar grains at higher temperatures in these materials. A material containing 2% $Y_2O_3$ on the other hand does not show columnar grain growth under the test conditions at temperatures up to at least 2000° C. and thus is preferable. The inhibition of grain growth is maintained up to $Y_2O_3$ concentrations of at least 5% and, it may be presumed, at even higher concentrations but it must be noted that the presence of $Y_2O_3$ tends to inhibit the sintering of $UO_2$ and that at these higher concentrations it becomes difficult to prepare a dense ceramic suitable for use as a nuclear fuel (the density of the ceramic containing 5% $Y_2O_3$ described above was 10.06 g./cc.).

What we claim is:
1. A polycrystalline uranium dioxide ceramic containing from 0.5 to 5% by weight of yttrium oxide to reduce columnar grain growth of the ceramic when subjected to steep temperature gradients at temperatures of from 1600° C. to 2000° C.
2. A polycrystalline uranium dioxide ceramic according to claim 1 containing from 1.25 to 3% by weight of said yttrium oxide.
3. A polycrystalline uranium dioxide ceramic according to claim 1 containing from 1.75 to 2.25% by weight of said yttrium oxide.

References Cited

Nuclear Science Abstracts, vol. 14, No. 24A, Dec. 31, 1960, NSA 25929.

CARL D. QUARFORTH, *Primary Examiner.*

BENJAMIN R. PADGETT, *Examiner.*

S. J. LECHERT, Jr., *Assistant Examiner.*